United States Patent
Choi et al.

(10) Patent No.: US 8,010,899 B2
(45) Date of Patent: Aug. 30, 2011

(54) SYSTEM OFFERING A DATA-SKIN BASED ON STANDARD SCHEMA AND THE METHOD

(75) Inventors: Kyong Ung Choi, Jeollabuk-do (KR); Jeong Mun Lee, Jeollabuk-do (KR); Kyung Yong Lee, Jeollabuk-do (KR); Hae Seok Jung, Seoul (KR)

(73) Assignee: Our Tech Co., Ltd., Jeollabuk-do (KR)

( * ) Notice: Subject to any disclaimer, the term of this patent is extended or adjusted under 35 U.S.C. 154(b) by 842 days.

(21) Appl. No.: 11/912,329

(22) PCT Filed: Nov. 29, 2005

(86) PCT No.: PCT/KR2005/004041
§ 371 (c)(1),
(2), (4) Date: Oct. 23, 2007

(87) PCT Pub. No.: WO2007/064050
PCT Pub. Date: Jun. 7, 2007

(65) Prior Publication Data
US 2008/0189206 A1    Aug. 7, 2008

(51) Int. Cl.
*G06F 3/00* (2006.01)
*G06F 3/14* (2006.01)

(52) U.S. Cl. .................. 715/746; 715/762; 715/864

(58) Field of Classification Search .............. 715/746, 715/762, 864; 717/107, 121; 705/35, 38, 705/39
See application file for complete search history.

(56) References Cited

U.S. PATENT DOCUMENTS

| | | | |
|---|---|---|---|
| 6,757,869 B1* | 6/2004 | Li et al. ................. | 715/205 |
| 7,093,198 B1* | 8/2006 | Paatero et al. .............. | 715/746 |
| 7,451,403 B1* | 11/2008 | Srinivasan et al. ........... | 715/763 |
| 7,519,914 B2* | 4/2009 | Fernandez et al. ........... | 715/762 |

(Continued)

FOREIGN PATENT DOCUMENTS

JP        2003-288143        10/2003

(Continued)

OTHER PUBLICATIONS

Phillip J. Eby's Zope Center; DataSkinsOverview; Downloaded Mar. 16, 2010; http://www.zope.org/members/pje/wikis/zpatterns/dataskinsoverview; pp. 1-4.*

(Continued)

*Primary Examiner* — Ella Colbert
(74) *Attorney, Agent, or Firm* — Adam Sacharoff; Much Shelist

(57) ABSTRACT

The present invention provides to a system and method of providing a data-skin based on a standard schema. In the data skin provision method, a user accesses and logs in to a data skin server. A meta-database is searched for a list of XSDs and skins to represent data. If desired XSD exists, the data skin server maps the XSD to data of the user, thus creating an XML document. A skin storage means is searched for a skin file and the skin file is selected. If the selected skin file is a payable skin file, user information is input to a payment server, and then payment is processed and an approval is obtained. The selected skin file is downloaded to a user computer, or the XML document is mapped to the skin file and various format documents are created and downloaded to the user computer.

2 Claims, 11 Drawing Sheets

U.S. PATENT DOCUMENTS

| | | | |
|---|---|---|---|
| 2004/0111673 A1* | 6/2004 | Bowman et al. | 715/513 |
| 2004/0153968 A1* | 8/2004 | Ching et al. | 715/513 |
| 2005/0050054 A1* | 3/2005 | Clark et al. | 707/100 |
| 2005/0268233 A1* | 12/2005 | Perla et al. | 715/703 |

FOREIGN PATENT DOCUMENTS

| KR | 1020020000569 A | 1/2002 |
|---|---|---|

OTHER PUBLICATIONS

Dwight Deugo; "Foundation Patterns"; Copyright 1998; Carlton University; pp. 1-16.*

Rani Pinchuk and Yonat Sharon; "The Skin Pattern"; Date Unknown; pp. 1-11.*

* cited by examiner

SYSTEM OFFERING A DATA-SKIN BASED ON STANDARD SCHEMA AND THE METHOD

FIELD OF THE INVENTION

The present invention relates, in general, to the provision of template service, which enables XML schema definition-based XML documents to be viewed in various respects in a web environment and, more particularly, to a system and method of providing a data-skin based on a standard schema, which provide template service through skins, and map XML documents created by a user to skins stored in a skin server, thus variously representing XML documents.

BACKGROUND OF THE INVENTION

Conventionally, most documents on a web are created in HyperText Markup Language (HTML), which is one of the programming languages used when documents viewable through a world wide web, that is, one of Internet services, are created. The HTML does not require a compiler and has attracted attention as an easy language interpretable in a web browser, but there are limitations in that a homepage construction function, a search function or a client system has been complicated, and it is difficult for an Internet user to add content to a website or manage content.

Accordingly, an eXtensible Markup Language (XML), recently established as a new standard for representing and exchanging data on the Internet, has been newly popularized in fields such as databases or electronic commerce.

Since XML enables a user to freely manipulate a structurized database, the XML user can freely extend data format using tags, which the user defines respectively, information and a representation method thereof can be completely separated, and the meaning and structure of information are contained in an XML document, unlike HTML.

Currently, eCO FrameWork of CommerceNet, which initiated XML under the lead of Commerce One, RosettaNet's Partner Interface Processes (PIPs), commerce XML (cXML) promoted by Ariba, and Biztalk of Microsoft have led the XML market. Standards, such as Cascaded Style Sheet (CSS), Extensible Business Report Language (XBRL), Extensible Style Language. Transformation (XSLT), Commerce XML (cXML), Document Type Definition (DTD), or XML Schema Definition (XSD), have since been established.

Software programs, such as various XML editing tools, an XML Parser, an XML storage manager, an XML document converter or a reporting tool, have been commercialized based on the standards. However, these software programs are problematic in that, since they require a lot of time and cost to create a document format, it is difficult to variously represent documents.

BRIEF SUMMARY OF THE INVENTION

Accordingly, the present invention has been made keeping in mind the above problems, and an object of the present invention is to provide a system and method of providing a data skin based on a standard schema, which enable XSD-based XML documents to be viewed in a web environment from different standpoints.

Another object of the present invention is to provide a system and method of providing a data skin based on a standard schema, which allow a typical user to access a data skin server, select a skin corresponding to an XML document that the user holds or creates, and map the XML document to the skin, thus variously representing the XML document in a document format desired by the user.

In order to accomplish the above objects, the present invention provides a system for providing a data skin based on a standard schema in a template service provision system for representing the same information in various respects in a web environment, comprising a meta-database for storing therein information about an Extensible Markup Language (XML) Schema Definition (XSD), which defines format of an XML document, and skins, and supporting a search of skins; skin storage means for storing therein skin files, which are kinds of various document templates created based on a standard schema (XSD); a data skin server for providing the skin files stored in the skin storage means to a user computer, which has accessed the data skin server through the Internet, creating an XML document through mapping of data which the user holds to the XSD, mapping a skin file selected by the user to the XML document, converting mapped results into various templates, and providing the templates; and the user computer for accessing the data skin server to convert data which the user computer holds into the XML document, and receiving commands necessary for selecting a desired type of skin, mapping the selected skin to the XML document and generating a final document.

Preferably, the data skin provision system may further comprise a payment server for processing payment using information about the user under the control of the data skin server if the skin file selected by the user is a payable file; and a payment database for storing therein data required to determine approval or disapproval for each user when payment and approval are requested using the user information.

Preferably, the data skin server may comprise a user management processor for determining an ID and a password of the user who accesses the data skin server, and determining whether to authorize the user to log in to the data skin server; a skin registration processor for creating a skin directory required for the user, having logged in to the data skin server through the user management processor, to register a skin, creating a schema and designing a skin; a skin management processor for providing a list of skins registered through the skin registration processor, and providing the skins so that the skins, classified into free skins and payable skins, are able to be downloaded; a payment management processor for attempting to process payment through an external payment server using the user information and transmitting approval or disapproval results in a case in which a skin is classified as a payable skin by the skin management processor; and a skin output processor for automatically mapping the skin selected by the user to the XML document designated by the user, thus outputting mapped results as a document having a format desired by the user. Preferably, the skin registration processor may comprise a category design processor for supporting a function of generating a directory structure so as to classify and store skins before the user, having logged in to the data skin server, registers a skin; a schema design processor for supporting a function of allowing the user to personally create an XSD and upload the XSD to the data skin server, and a function of automatically creating an XSD by querying the meta-database; and a skin design processor for creating various skins based on the created XSD and registering the created skins.

Further, in order to accomplish the above objects, the present invention provides a method of providing a data skin based on a standard schema in a template service provision method of representing the same information in various respects in a web environment, comprising the steps of a user accessing and logging in to a data skin server; searching a meta-database for a list of XSDs and skins to represent data through a skin management processor of the data skin server after the user has logged in to the data skin server; if a desired XSD exists as a result of the search, the data skin server mapping the XSD to data which the user holds, thus creating an XML document; searching skin storage means for a skin file desired by the user and selecting the skin file after the XML document has been created; if the selected skin file is a payable skin file, inputting information about the user to a payment server, and then processing payment and obtaining an approval; and downloading the selected skin file to a computer of the user, or mapping the XML document to the skin file, creating various format documents, and downloading the various format documents to the user computer, after the approval has been obtained. Preferably, the data skin provision method may further comprise the steps of if an XSD desired by the user does not exist in the meta-database, the user registering an XSD having a structure of desired information to be represented; and the user registering the type and format of required skin and requesting development of the skin.

Further, in order to accomplish the above objects, the present invention provides a method of providing a data skin based on a standard schema in a template service provision method of representing the same information in various respects in a web environment, comprising a first step of a user accessing and logging in to a data skin server, and determining whether to search for an XSD or register a skin; a second step of, if it is determined that an XSD is to be searched for, searching for a list of XSDs and skins previously registered in a meta-database through a skin management processor of the data skin server; a third step of the user selecting a specific skin list desired by the user, as a result of the search; a fourth step of, if the selected skin is a payable skin, inputting information about the user to a payment server, and then processing payment and obtaining approval; a fifth step of searching skin storage means for a skin file suitable for an XML document and selecting the skin file through a skin output processor, after the approval has been obtained; and a sixth step of downloading the selected skin file to the user computer or creating various format documents using the skin file, depending on the user's selection.

Preferably, the data skin provision method may further comprise, if data stored in a Database Management System (DBMS) of the user, not the XML document, is used at the fifth step, the steps of making a query suitable for the data and automatically converting the data into an XML document so as to convert the corresponding data into the XML document; and uploading the created XML document to a skin output processor, thus mapping a found skin file to the XML document.

Preferably, the data skin provision method may further comprise, if the user has an XML document at the fifth step, the steps of the skin output processor searching skin storage means for a skin file suitable for the XML document so as to perform skin mapping after approval has been obtained through the payment server; uploading the XML document to the skin output processor through the DBMS of the user, after the skin file has been found; and the skin output processor mapping the skin file to the XML document, thus creating a document.

Preferably, the data skin provision method may further comprise, if a skin is to be registered at the first step, the steps of creating a directory, in which a skin desired by the user is to be stored, through a category design processor after the user has logged in, and storing information about the directory in the meta-database; the user creating a desired XSD through a schema design processor and storing information about the XSD in the meta-database; creating information about the skin through a skin design processor after the XSD has been created, and uploading a skin file personally created by the user to the skin design processor; and the skin design processor storing information about the skin in the meta-database, and then storing and registering the skin file uploaded by the user in the skin storage means.

DETAILED DESCRIPTION OF THE INVENTION

Figure 1:
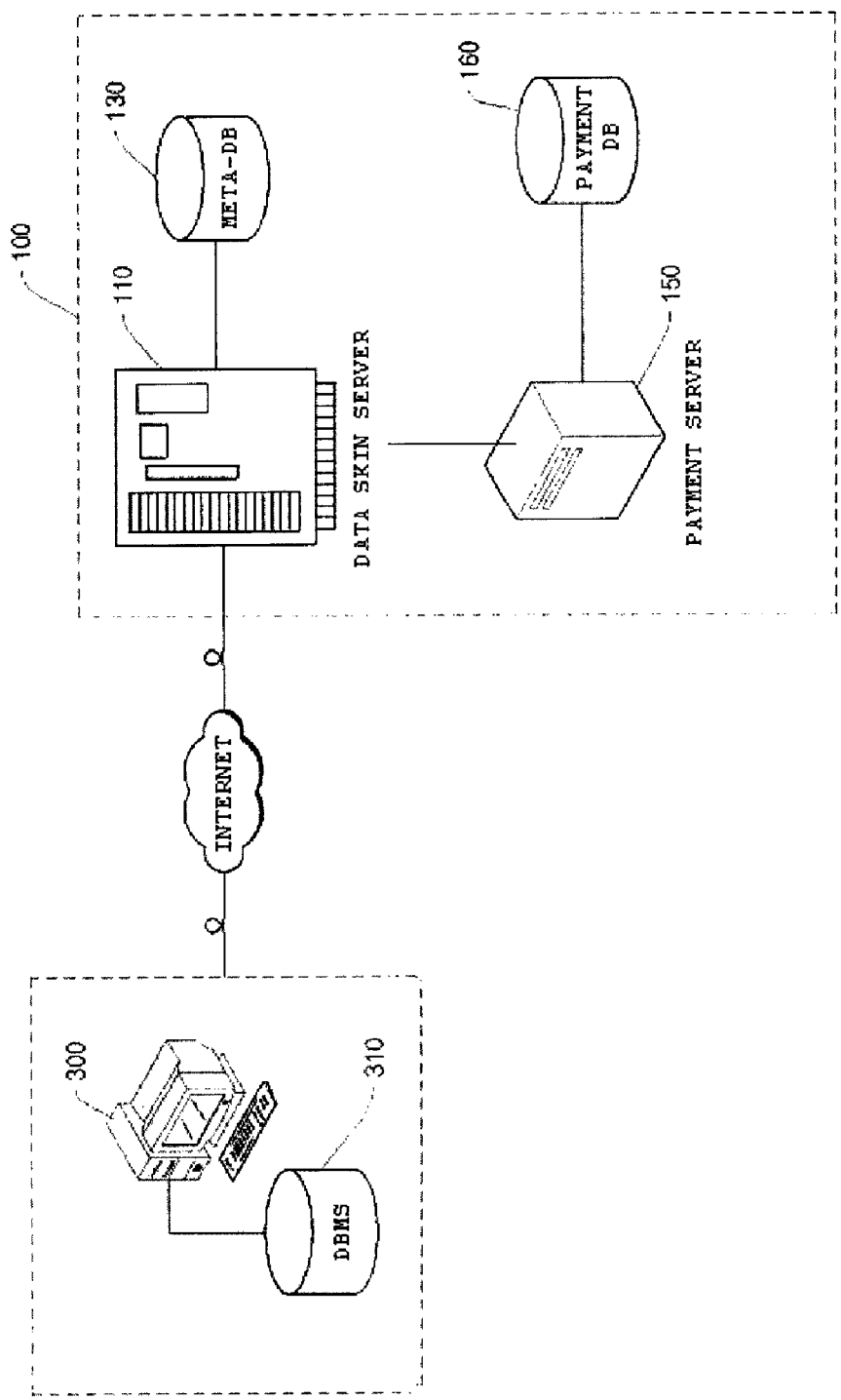
FIG. 1 is a diagram of a system for providing a data skin according to the present invention.

100: data skin portal server
110: data skin server
111: user management processor
113: skin registration processor
113-1: category design processor
113-2: schema design processor
113-3: skin design processor
115: skin management processor
117: payment management processor
119: skin output processor
130: meta-database
140: skin storage means
150: payment server
160: payment database
300: user computer
310: Database Management System (DBMS)

Hereinafter, embodiments of the present invention will be described in detail with reference to the attached drawings.

FIG. 1 is a diagram of a system for providing a data skin using a schema according to the present invention. The data skin provision system includes a data skin portal server 100, the Internet 200 and a user computer 300.

The data skin portal server 100 includes a meta-database 130, a skin storage means 140, a payment server 150 and a data skin server 110. The user computer 300 includes a web browser and a Database Management System (DBMS) 310.

The meta-database 130 is constructed to support the storage of information about XSD, defining the format of an XML document, and skins, and the search of the skins. The skin storage means 140 stores therein skin files, which are kinds of various document templates created based on standard schemas (XSDs). The data skin server 110 provides skin files, stored in the skin storage means 140, to the user computer 300 connected to the data skin server 110 through the Internet so that an XML document is created through the mapping of the user's data to XSD, a skin file selected by the user and the XML document are mapped to each other to complete various templates, and the various templates are provided to the user computer 300. The payment server 150 is constructed to process payment using user information under the control of the data skin server 110 when the skin file selected by the user is a payable file.

Further, the user computer 300 is constructed to access the data skin server 110 and execute commands for searching the meta-database 130 for an XSD required to convert data, which the user computer 300 holds, into an XML document, creating an XML document through the mapping of a found XSD to the data of the user computer, and mapping a skin file selected by the skin storage means 140 to the XML document to create a final document.

Moreover, the payment server 150 further includes a payment database 160 for storing therein data required to determine approval or disapproval for each user when payment and approval are requested using user information. The configuration and attributes of a list of XSDs and skins stored in the meta-database 130 are drawn up based on the XML Schema Definition (XSD), which is a standard schema.

Figure 2:
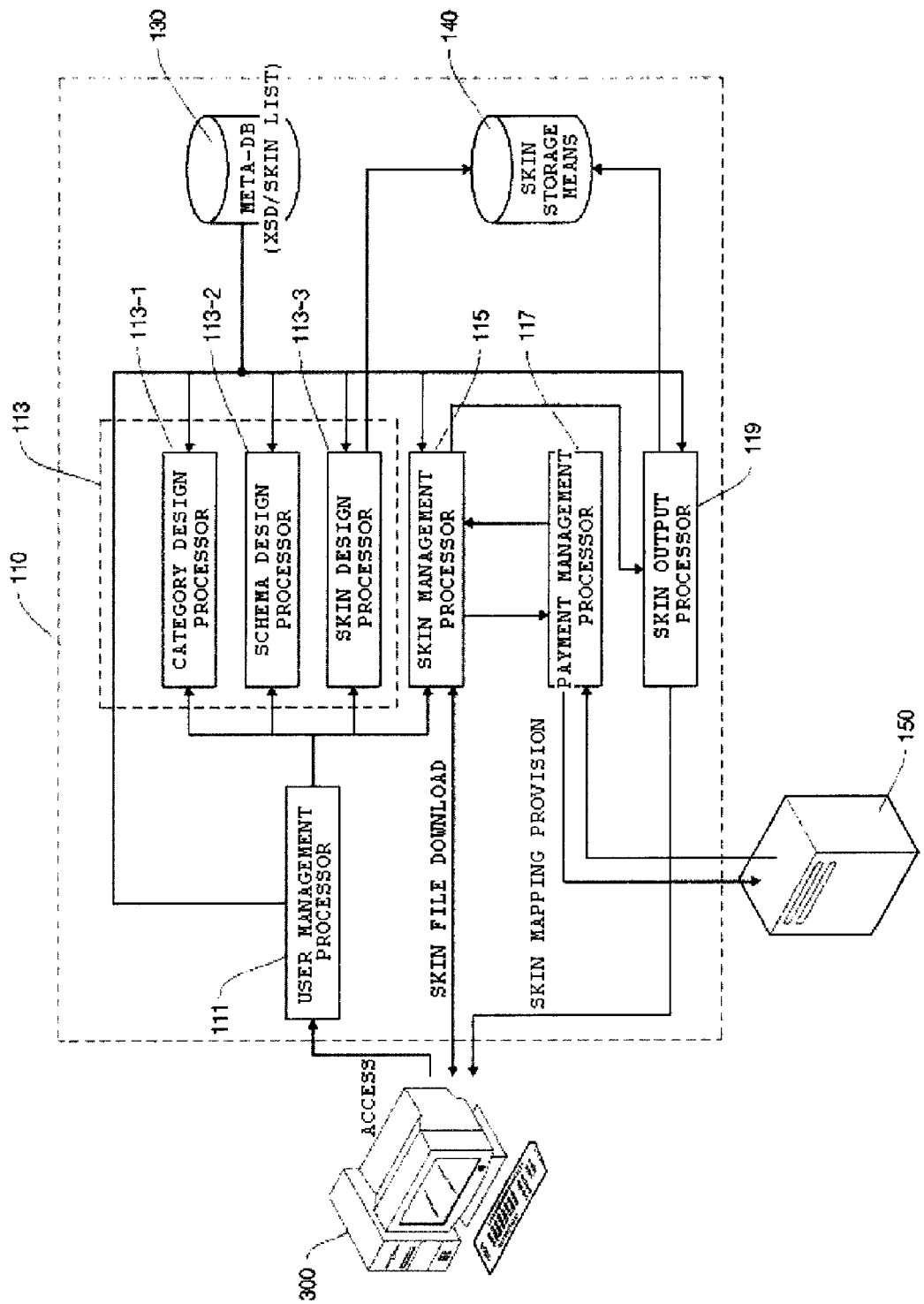
FIG. 2 is a block diagram showing the detailed construction of a data skin server according to the present invention.

FIG. 2 is a block diagram showing the detailed construction of the data skin server 110 according to an embodiment of the present invention. The data skin server 110 includes a user management processor 111, a skin registration processor 113, a skin management processor 115, a payment management processor 117, and a skin output processor 119. The skin storage means 140, for storing therein skin files, and the meta-database 130, for storing structurized data, are constructed together in the data skin server 110.

The user management processor 111 functions to determine an ID and a password input by a user who accesses the data skin portal server 100, and inform the user whether the user is authorized to log in to the data skin portal server 100.

The skin registration processor 113 is constructed to create a skin directory, which is required for the user having logged in to the data skin server 110 through the user management processor 111 to register skins, and constructed to create schemas and design skins. The skin registration processor 113 includes a category design processor 113-1 for supporting a directory structure that is required to classify and store skins before the user, having logged in to the data skin server 110 through the user management processor 111, registers skins, a schema design processor 113-2 for allowing the user to personally create a standard schema, or for automatically creating a schema and uploading the schema file of the user by requesting the standard schema from the meta database 130, so as to support the schema because the skins are based on the standard schema, and a skin design processor 113-3 for creating a plurality of skins with respect to a single standard schema and producing skins using a programming language in which XML documents can be created.

That is, the category design processor 113-1, the schema design processor 113-2 and the skin design processor 113-3 are processors for registration that are used when skin files are registered in the skin storage means 140.

Farther, since the skins are created based on a standard schema, the schema design processor 113-2 must support the definition of a schema, so that a standard schema can be personally created by the user, or automatically created by querying the meta-database 130. Further, the schema design processor 113-2 can also perform the function of uploading and registering a schema, established as a standard, or the schema file of the user, even though the schema design processor 113-2 does not create a schema.

The skins can be considered to be various reports that can be created based on a standard schema. The skin design processor 113-3 can create a plurality of skins with respect to a single standard schema, so that various types of reports to be viewed are provided if the user only has an XML document.

The skins can be created using a word processor capable of creating XML documents, and can be produced in a programming language. If the skins, having been created through the above process, are registered by the user through the skin design processor 113-3, the skins are stored in the skin storage means 140.

Further, the skin management processor 115 functions to show the skins registered in the skin design processor 113-3 to the user in the form of a list provided by the meta-database 130 and functions to allow the user to download the skins. Free skins can be immediately downloaded, but payable skins must be paid for and approved through the payment management processor 117 so as to be able to be downloaded.

Once a payment request is input to the payment management processor 117, the payment management processor 117 accesses the payment server 150 for substantially processing payment, and attempts to process payment using user information. As described above, if approval or disapproval results are transmitted by the payment server 150 to the payment management processor 117, the payment management processor 117 functions to inform the skin management processor 115 of the transmitted information.

Further, the skin output management processor 117 functions to automatically apply the XML document of the user to a skin selected by the user, map the XML document to the skin, and provide the mapped results to the user in the form of various documents that are converted to have an output format desired by the user.

Figure 3:
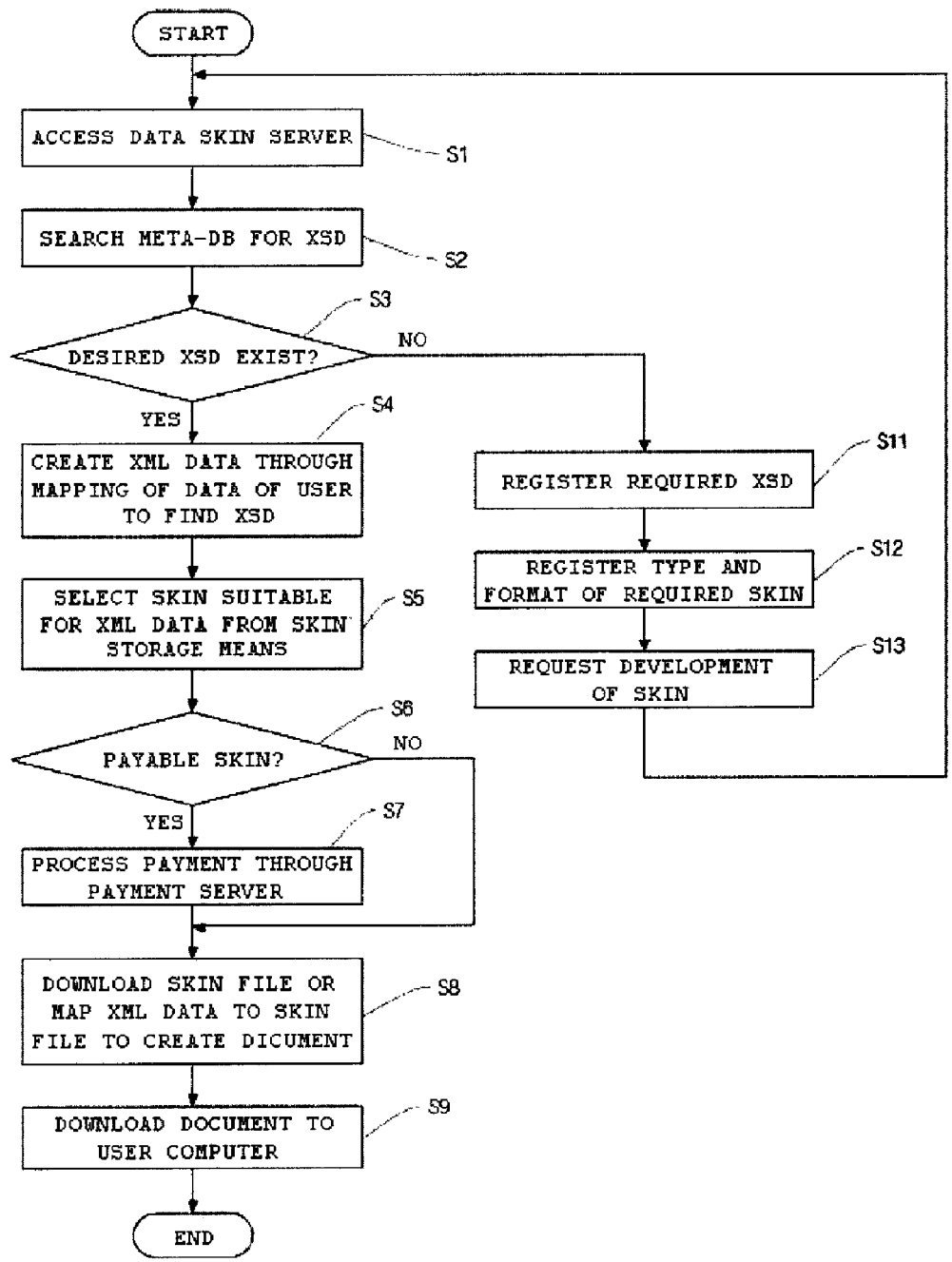
FIG. 3 is a flowchart showing an entire data skin provision portal service according to the present invention.

FIG. 3 is a diagram showing an entire operating process of FIG. 2 according to the present invention, which shows a data skin provision portal service.

First, the user accesses the data skin server 110 through the Internet, and logs in to the data skin server 110 through an authentication procedure performed by the user management processor 111 at step S1. The user searches the meta-database 130 for an XSD required to convert data extracted from the user DBMS 310 into an XML document at step S2.

The XSD is required to define the format of an XML document. Since a conventional XML/DTD uses the format of DID of a Standard Generalized Markup Language (SGML) without change, the conventional XML/DID does not have the format of an XML, so that it is impossible to define a common format type. Further, the type of data, the format of repetition of elements, etc. are restrictive, so that there are a great number of limitations in constructing the format necessary for the creation of a document. Accordingly, an XML schema definition (XSD) is proposed.

Further, XML/DTD is much simpler than XML/XSD and is convenient to use, but does not use the grammar of an XML, and uses different representations in a part for defining the structure of a document and in a part for using the document. However, since XML/XSD (schema) itself is an XML document, XML/XSD can be presented in a web browser.

If a search for a desired XSD has failed, that is, if a desired XSD does not exist in the meta-database 130 at step S3, the user registers a desired XSD through the skin registration processor 113, and registers the type and format of desired skin, thus requesting the development of the skin at steps S11 to S13.

In contrast, if the user's desired XSD exists in the meta-database 130 at step S3, the found XSD is mapped to the data which the user holds, that is, desired data to be extracted from the user DBMS 310, and then an XML document is created at step S4. A skin suitable for the XML document is searched for in the skin storage means 140, and is selected if the suitable skin exists at step S5.

If the selected skin is a payable skin at step S6, the data skin server 110 requests payment from the payment server 150 through the payment management processor 117, accesses an external system capable of processing payment, and attempts to process payment at step S7.

If payment has been completed, the user can download the skin to the user computer 300, map the skin to the XML document and view a final document, or can apply various skins to the XML document and view the XML document with the various skins in the web browser at steps S8 and S9.

Figure 4A:
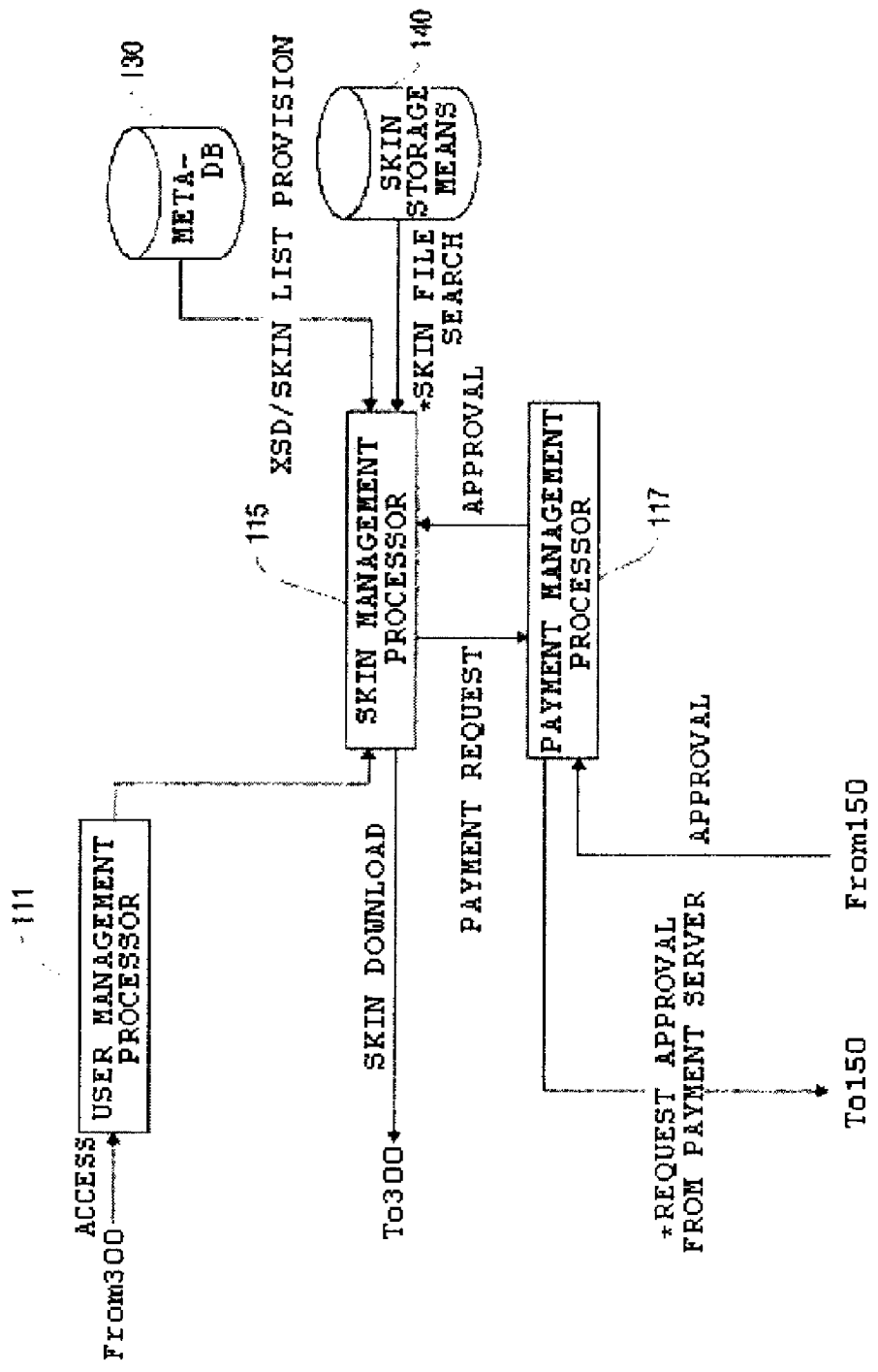
FIGS. 4a and 4b are a block diagram and a flowchart, respectively, showing a typical process of providing a data skin, according to an embodiment of the present invention.
Figure 5A:
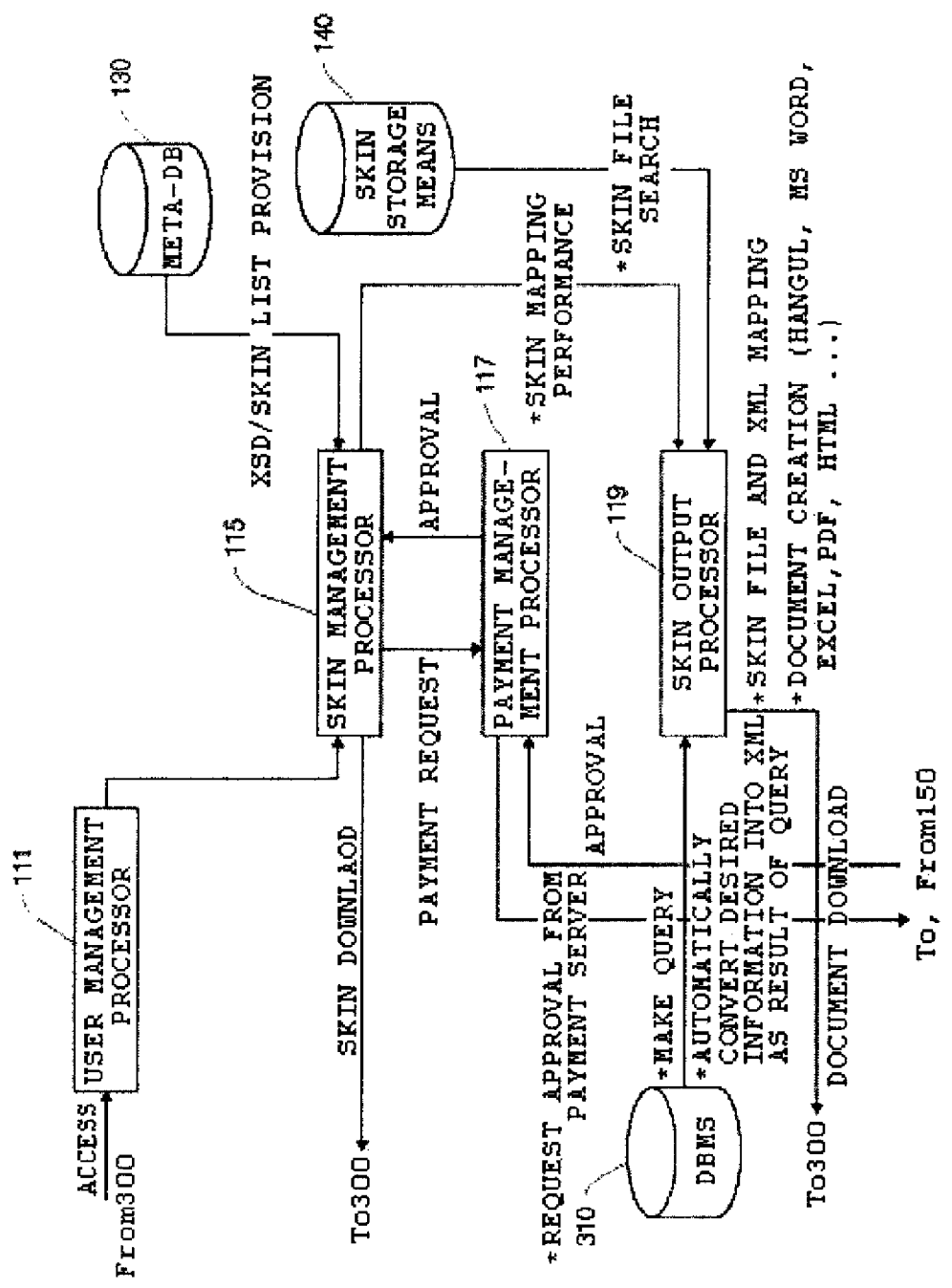
FIGS. 5a and 5b are a block diagram and a flowchart, respectively, showing a process of providing a data skin when a user holds typical data, according to an embodiment of the present invention.
Figure 5B:
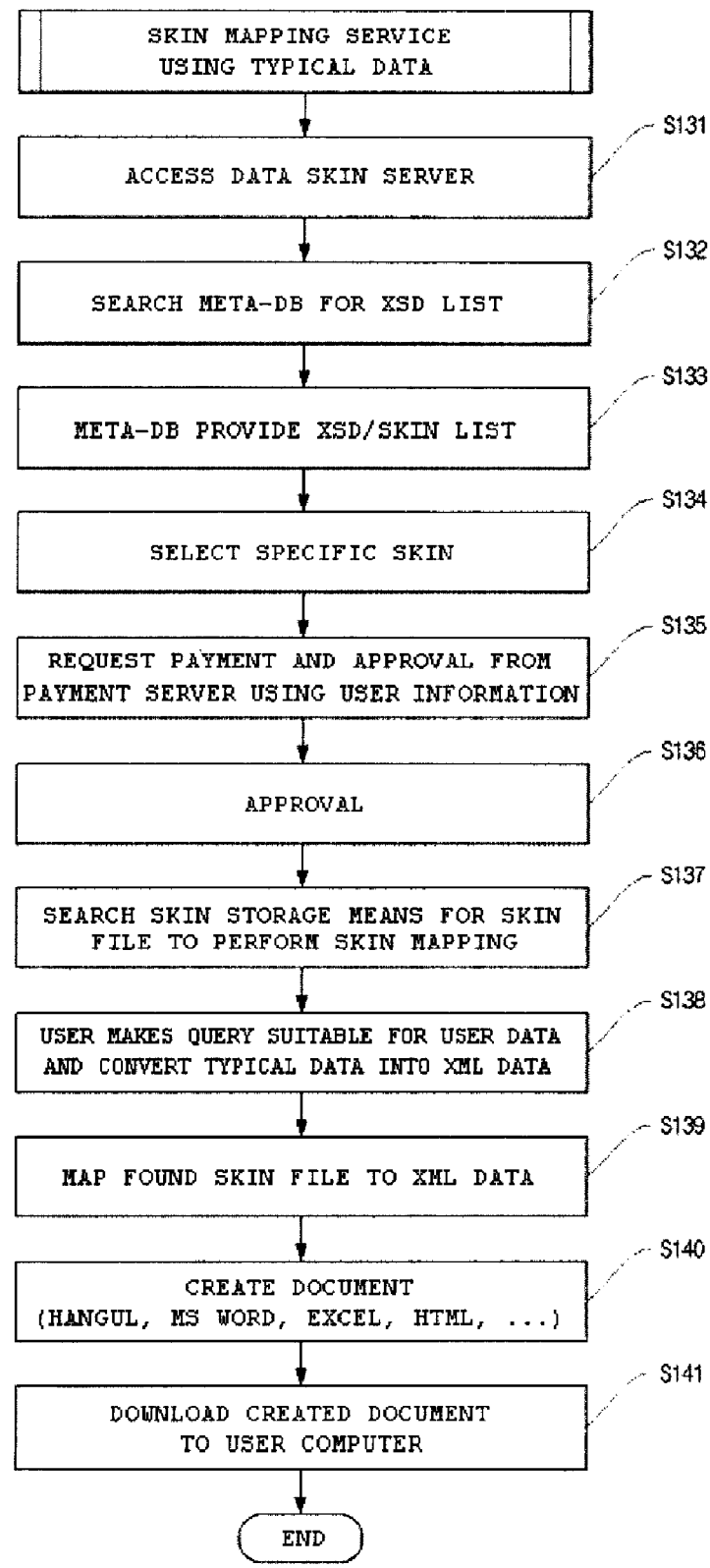
Figure 6A:
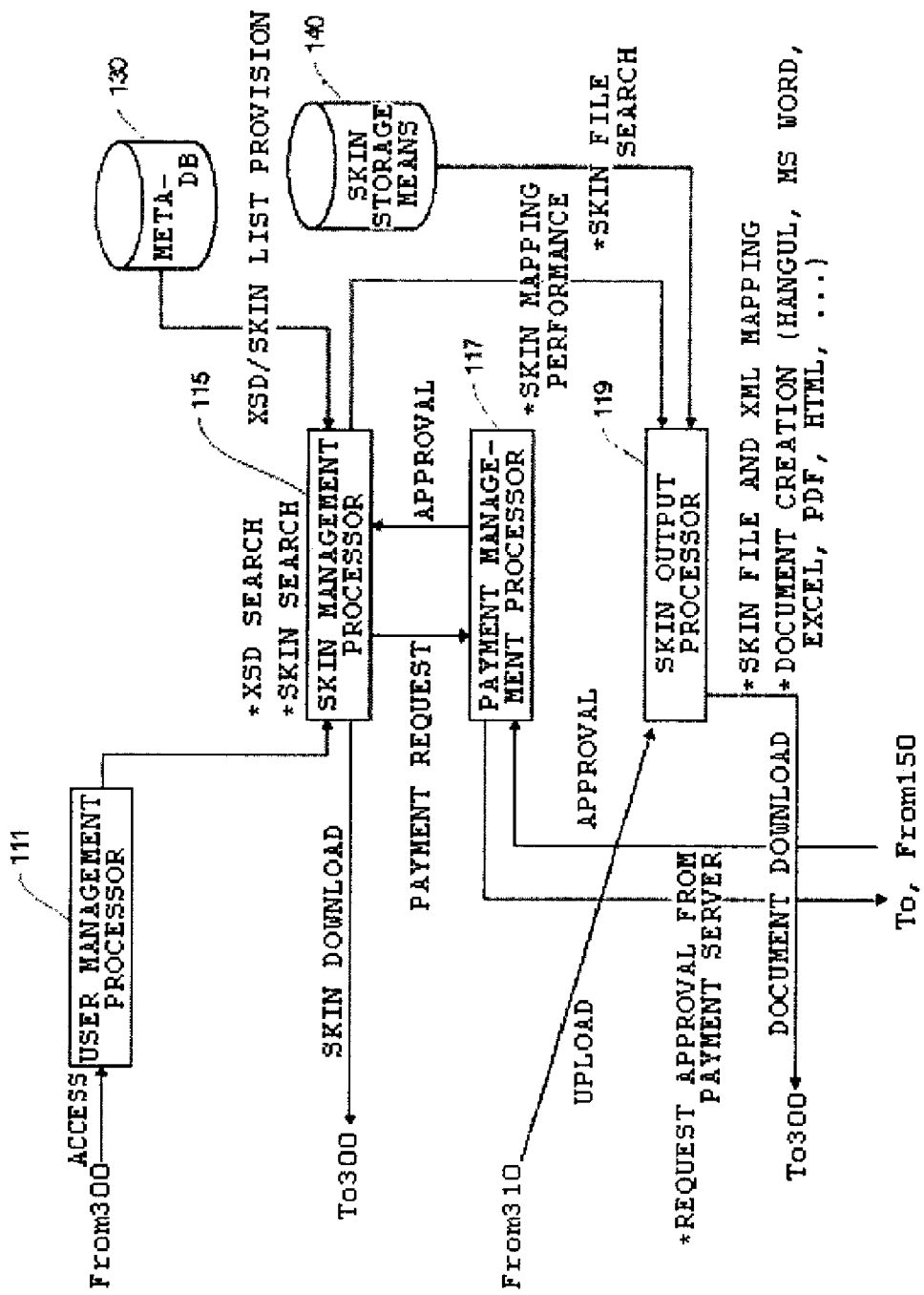
FIGS. 6a and 6b are a block diagram and a flowchart, respectively, showing a process of providing a data skin when a user holds an XML document, according to an embodiment of the present invention.
Figure 6B:
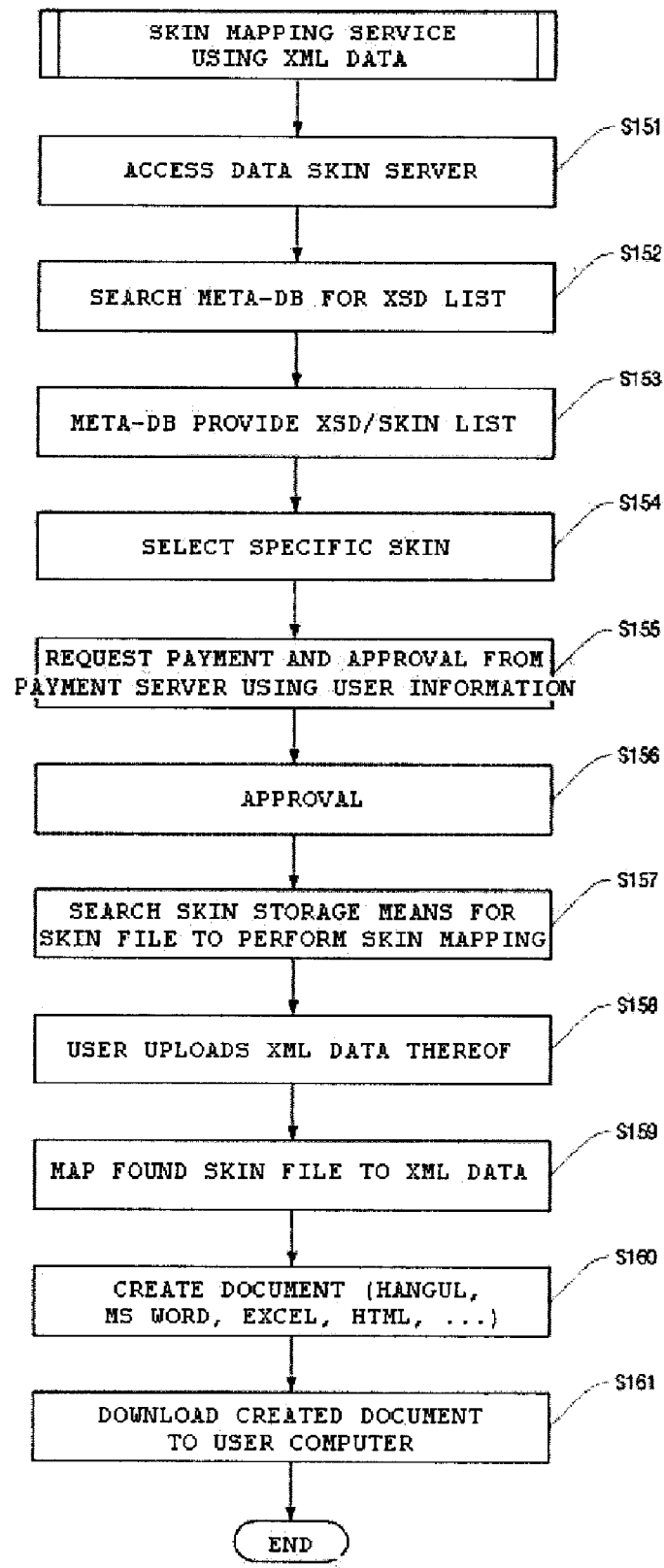
Figure 7A:
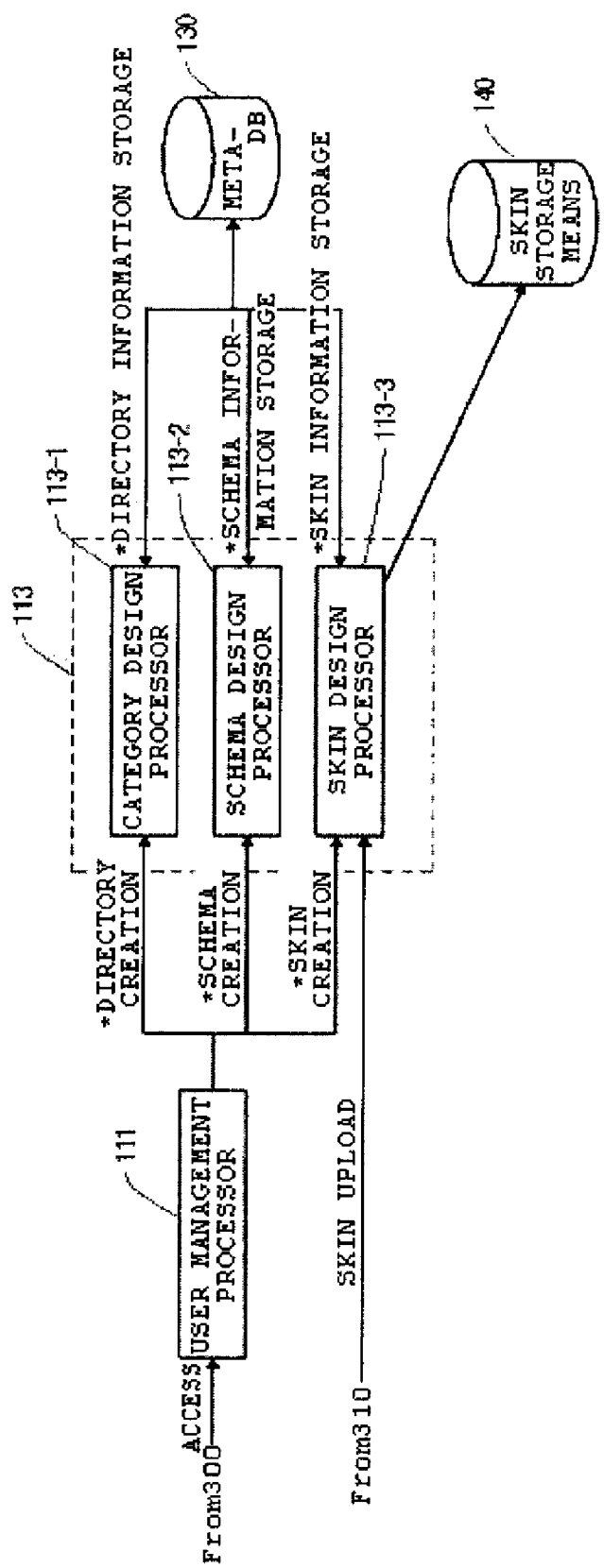
FIGS. 7a and 7b are a block diagram and a flowchart, respectively, showing a process of registering a skin according to the present invention.
Figure 7B:
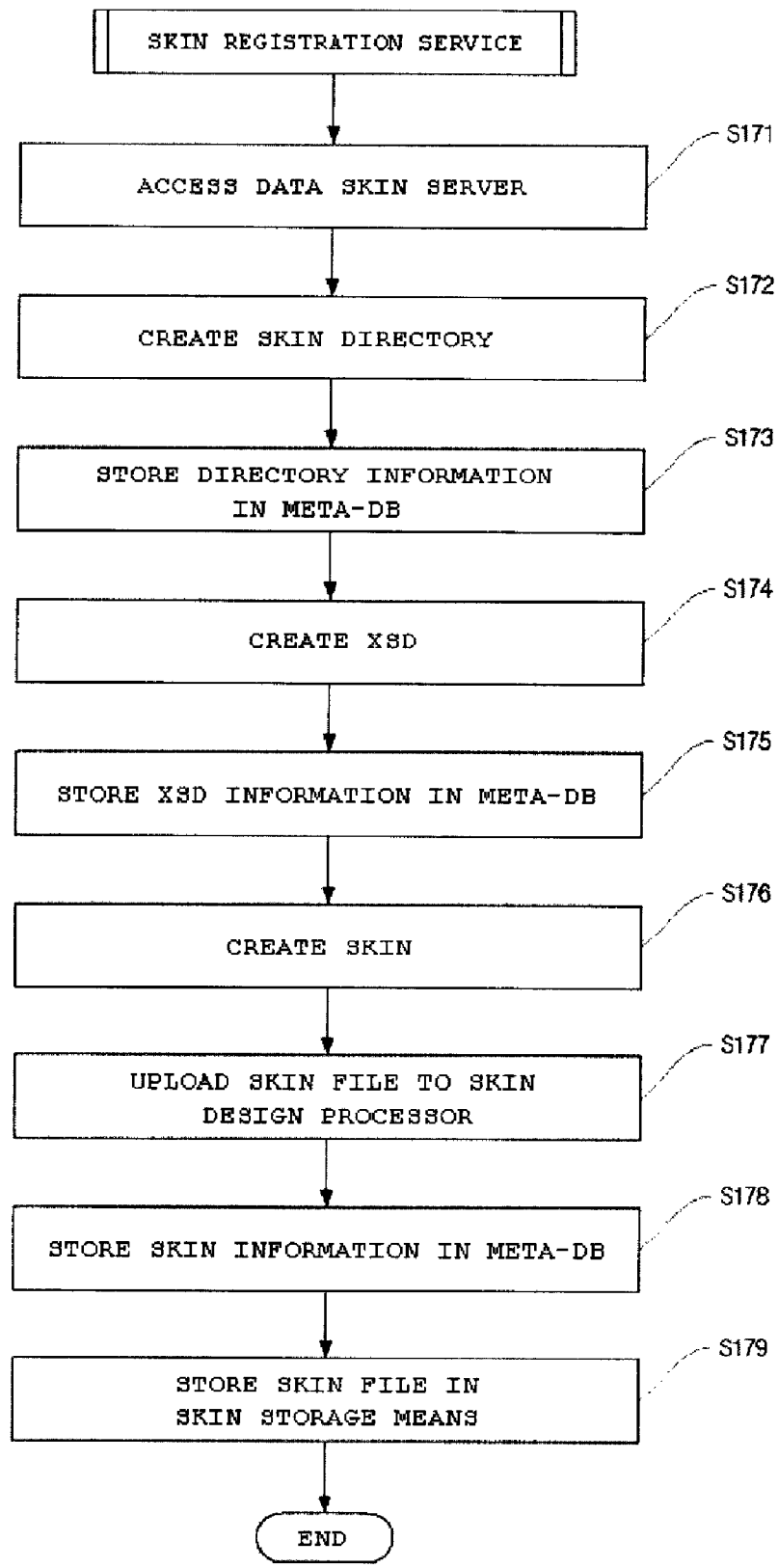

FIGS. 4a to 7b are diagrams showing respective detailed operating processes corresponding to requests for respective conditions of the user according to embodiments of the present invention. FIGS. 4a and 4b are a block diagram and a flowchart, respectively, showing a typical process of providing a data skin, FIGS. 5a and 5b are a block diagram and a flowchart, respectively, showing a process of providing a data skin when a user holds typical data, FIGS. 6a and 6b are a block diagram and a flowchart, respectively, showing a process of providing a data skin when a user holds an XML document, and FIGS. 7a and 7b are a block diagram and a flowchart, respectively, showing a process of registering a skin according to the present invention.

Figure 4B:
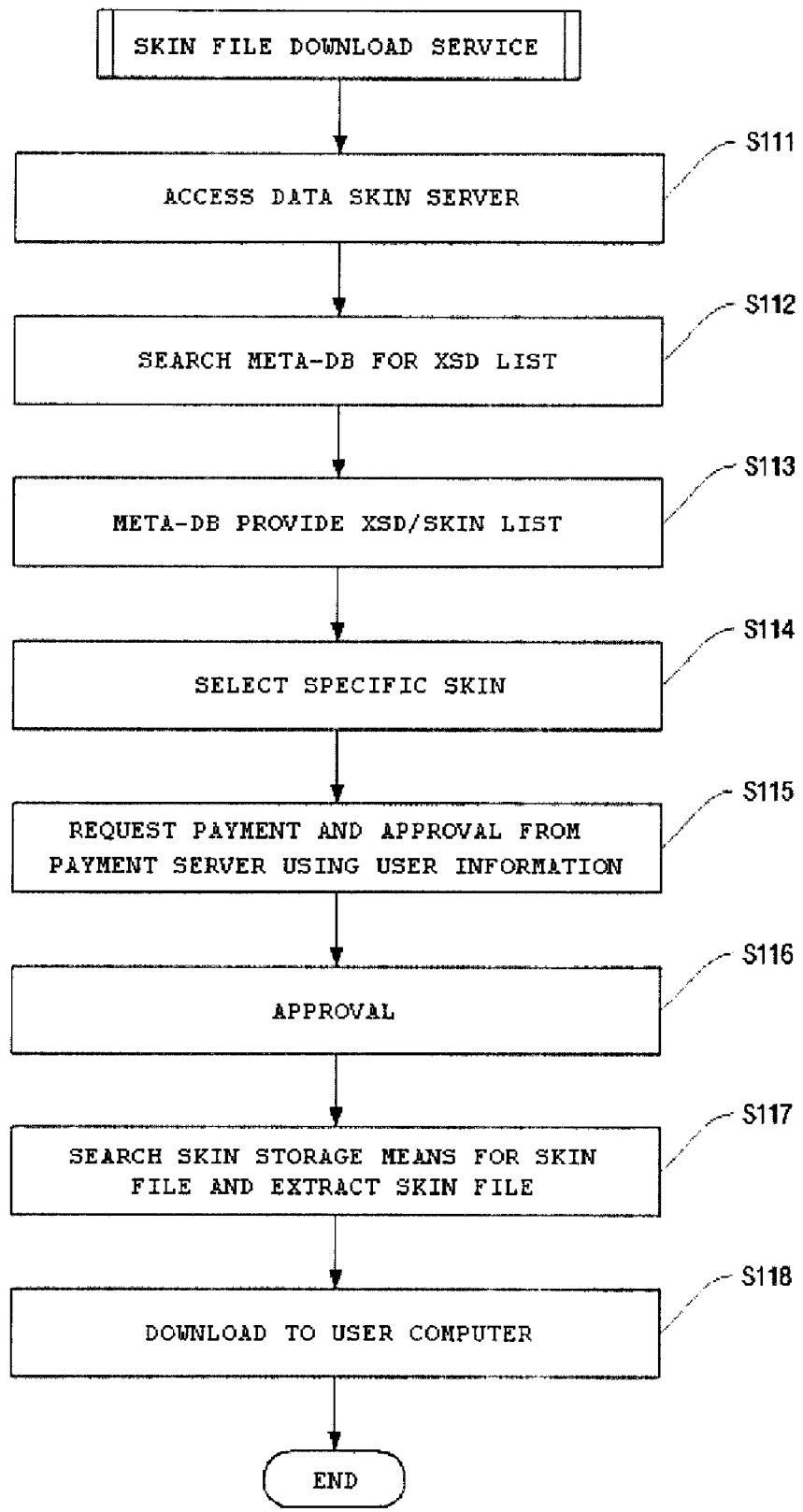

FIGS. 4a and 4b illustrate the skin provision service of the data skin portal server, which is a procedure used when the user intends to download and use a skin.

First, the user accesses the data skin server 110 through the Internet and logs in to the data skin server 110 through an authentication procedure performed by the user management processor 111 at step S111. The skin management processor 115 searches the meta-database 130 for an XSD required to convert desired data, which is to be extracted from the user DBMS 310, into an XML document at the request of the user at step S112. Accordingly, a list of stored XSDs and skins is read from the meta-database 130, and is provided to the user computer 300, thus enabling the list to be displayed on the user computer 300 at step S113.

The user views the list of XSDs and skins and then selects a specific skin at step S114.

If the selected skin is a payable skin, payment and approval are requested from the payment server 150 through the payment management processor 117 using the user information at step S115.

If payment has been processed and approval have been obtained by the payment server 150, the user searches the skin storage means 140 for a desired skin file through the skin management processor 115, extracts the desired skin, and downloads the extracted skin file to the user computer 300.

Since the user is provided only with a desired skin through this service, the user must personally create an XML document to be applied to the skin. The user can use an XML generator program so as to create an XML document. The XML generator program requires information about the mapping of an XSD to data extracted from the user DBMS 310, so that the user must form mapping information using a schema mapper program provided by the data skin server.

That is, after the user accesses the data skin server 110 and is authenticated through the user management processor 111, the user searches for a desired XSD and a skin suitable for the XML document through the skin management processor 115 on the basis of the list of XSDs and skins provided by the meta-database 130. As the corresponding skin is found, and a payment request is transmitted to the payment management processor 117, an attempt to request approval from the external actual payment server 150 is made again.

After approval or disapproval results from the payment server 150 have been transmitted to the payment management processor 117, and the payment management processor 117 transmits final payment and approval results, the skin management processor 115 provides the services of confirming payment and approval, searching the skin storage means 140 for the user's desired skin file, and providing the desired skin file to the user. Through these services, the user is provided only with a skin suitable for corresponding data, so that the user must personally create a required XML document and perform a mapping operation.

FIGS. 5a and 5b illustrate the case where the user holds typical data, not an XML document, which shows services of providing, skins, configuring typical data into an XML file, and providing skin mapping.

First, the user accesses the data skin server 110 through the Internet and logs in to the data skin server 110 through an authentication procedure performed by the user management processor 111 at step S131. The skin management processor 115 searches the meta-database 130 for an XSD required to convert required data, which is to be extracted from the DBMS 310, into an XML document at the request of the user at step S132.

Through this search, the meta-database 130 transmits and shows a list of stored XSDs and skins to the user computer 300 at step S133, and the user selects a specific skin from the list at step S134.

If the selected skin is a payable skin, the data skin server 110 requests payment from the payment server 150 through the payment management processor 117, accesses an external system capable of processing payment, and attempts to process payment at step 135.

Once payment and approval have been completed at step S136, skin mapping is performed by the skin output processor 119. First, the skin output processor 119 searches the skin storage means 140 for a skin file selected by the user, and is provided with information about the corresponding skin file at step S137. The user makes a query in order for the DBMS 310 to convert desired information into an XML document, so that typical data is automatically converted into the XML document through the skin output processor 119 at step S138.

Next, the skin output processor 119 maps the created XML document to the found skin file, and converts the mapped results into an output format desired by the user (Hangul, MS Word, Excel, HTML, Flash, etc.) at steps S139 and S140. Thereafter, the skin output processor 119 downloads the created document to the user computer 300 at step S141.

That is, after the user searches for an XSD and selects a corresponding skin through the skin management processor 115, from the list of XSDs and skins provided by the meta-database 130, payment is processed and approval is obtained through the payment management processor 117 and the payment server 150.

The skin management processor 115 transmits information necessary for skin mapping to the skin output processor 119, searches the skin storage means 140 for the skin file selected by the user, and transmits information about the corresponding skin file to the skin output processor 119. Further, a query is made in order for the user DBMS 310 to convert desired information into an XML document. An XML file, created as a result of the query, and the skin file, found from the skin storage means 140, are mapped to each other by the skin output processor 119, and the mapped results are converted into output format desired by the user.

FIGS. 6a and 6b illustrate a service provided when the user holds an XML document, which shows that a procedure of the user DBMS 310 converting desired information into an XML document is omitted from the procedure of FIG. 5.

The user accesses the data skin server 110 through the Internet and logs in to the data skin server 110 through an authentication procedure performed by the user management processor 111 at step S151. The skin management processor 115 searches the meta-database 130 for an XSD required to convert data, which is to be extracted from the DBMS 310, into an XML document at the request of the user at step S152.

The meta-database 130 transmits and shows the list of XSDs and skins stored therein to the user computer 300 as a result of the search at step S153. The user selects a specific skin from the list of XSDs and skins at step S154.

If the selected skin is a payable skin, the data skin server 110 requests payment from the payment server 150 through the payment management processor 117, accesses an external system capable of processing payment, and attempts to process payment at step S155.

Once payment and approval have been completed at step S156, skin mapping is performed by the skin output processor 119. First, the skin output processor 119 searches the skin storage means 140 for a skin file selected by the user at step S157, and the user uploads his or her XML document to the skin output processor 119 at step S158.

Next, the skin output processor 119 maps a found skin file to the XML document, and converts the XML document into output format desired by the user (Hangul, MS Word, Excel, HTML, Flash, etc.) at steps S159 and S160. Thereafter, the created document is downloaded to the user computer 300, so that an XML skin document based on the desired XSD can be finally viewed at step S161.

Therefore, after the user logs in to search for an XSD and select a skin, payment and approval are completed through the payment management processor 117 and the skin management processor 115, and then skin mapping is performed. In this case, the skin file selected by the user is searched for in the skin storage means 140, and the XML file of the user is uploaded to the skin output processor 119.

Further, after mapping the skin file to the uploaded XML file, the skin output processor 119 converts the mapped results into output format desired by the user, and downloads the output format.

FIGS. 7a and 7b illustrate a procedure performed when a skin file that does not exist in the data skin server 110 is intended to be registered. When a skin desired by the user does not exist in the data skin server 110, the procedure is performed through the skin registration processor 113.

First, the user accesses the data skin server 110 at step S171, and creates a directory in which requests, such as the type of report or the type of design desired by the user, are to be stored, through the category design processor 113-1 at step S172. Information about the directory is structurized and stored in the meta-database 130 at step S173.

After the directory information has been stored in the meta-database 130, the user creates an XSD through the schema design processor 113-2 at step S174, and stores information about the XSD in the meta-database 130 at step S175.

After the XSD has been created, a skin is created through the skin design processor 113-3 at step S176. The user uploads the created skin file to the skin design processor 113-3 at step S177. The skin design processor 113-3 stores information about the skin in the meta-database 130 at step S178, and also stores the skin file in the skin storage means 140 at step S179.

In the above embodiment, an example in which a standard schema is implemented based on an XSD has been described. However, it is apparent that the present invention can be variously modified and implemented by those skilled in the art, such as by employing a D=D as a standard schema or slightly changing a time-series-based execution procedure. These modified embodiments should not be understood separately from the technical spirit or the prospect of the present invention, but should be considered to belong to the accompanying claims of the present invention.

Accordingly, as all applications, processes and data have been called by XML messages represented in a standardized format (Web Services Description Language: WSDL), and data transmission using standardized protocols has been widely used in XML-based web service, the present invention is intended to represent information in various document formats. Therefore, the present invention is advantageous in that, if a user accesses a data skin server and uses registered templates, complicated numeric data can be variously represented in the form of tables, charts or graphs, complicated equations can be easily drawn up, and various documents can be rapidly represented in document formats defined by standard organizations.

Further, although various software programs based on XSDs have been currently commercialized, a lot of time and cost are required to create a document format using these software programs, and it is impossible to variously represent each document. However, the present invention is advantageous in that a user only handles data, without caring about the templates of documents, thus improving efficiency in work.

The invention claimed is:

1. A method of providing a data skin based on a standard schema in a template service provision representing the same information in various respects in a web environment, comprising the steps of:

accessing and logging by a user into a data skin server;

searching a meta-database for a list of Extensible Markup Language (XML) Schema Definitions (XSDs) and skins to represent data through a skin management processor of the data skin server after the user has logged in to the data skin server;

mapping by the data skin server a desired XSD as a result of the search to data which is stored in the user's meta-database and creating an XML document;

searching a skin storage database for a skin file stored therein and desired by the user and selecting the skin file after the XML document has been created;

inputting information about the user to a payment server and processing a payment and obtaining an approval, if the selected skin file is a payable skin file; and downloading the selected skin file to a computer of the user, or mapping the XML document to the skin file and creating various format documents; and downloading the various format documents to the user computer after the approval has been obtained.

2. The data skin provision method according to claim 1, further comprising the steps of:

registering by the user an XSD having a structure of desired information to be represented if as a result of the search the desired XSD does not exist in the meta-database; and registering by the user the type and the format of a required skin and requesting development of the required skin.

* * * * *